United States Patent [19]

Christopher et al.

[11] Patent Number: 5,293,728
[45] Date of Patent: Mar. 15, 1994

[54] INSULATED PANEL

[75] Inventors: Michael E. Christopher, Houston; Oscar J. Chauvin, Pasadena, both of Tex.

[73] Assignee: Texas Aluminum Industries, Inc., Houston, Tex.

[21] Appl. No.: 946,756

[22] Filed: Sep. 17, 1992

[51] Int. Cl.$^5$ .......................... E04B 7/00; E04B 9/00; E04C 2/00
[52] U.S. Cl. ...................................... 52/588.1; 52/533; 52/309.9; 52/590.3
[58] Field of Search .................. 52/309.9, 309.11, 588, 52/595, 584, 471, 533, 539

[56] References Cited

U.S. PATENT DOCUMENTS

| | | |
|---|---|---|
| 1,913,342 | 6/1933 | Schaffert . |
| 2,142,305 | 1/1939 | Davis . |
| 2,284,229 | 5/1942 | Palmer . |
| 2,576,296 | 11/1951 | Green . |
| 2,596,280 | 5/1952 | Nystrom . |
| 2,644,552 | 7/1953 | MacDonald . |
| 2,682,938 | 7/1954 | MacDonald . |
| 2,838,144 | 6/1958 | MacDonald . |
| 3,293,812 | 12/1966 | Hamitt . |
| 3,304,680 | 2/1967 | Birdwell . |
| 3,331,173 | 7/1967 | Elsner . |
| 3,367,076 | 2/1968 | O'Brien . |
| 3,386,218 | 6/1968 | Scott ............................ 52/309.11 |
| 3,397,496 | 8/1968 | Sohns . |
| 3,479,784 | 11/1969 | Massagli . |
| 3,594,028 | 7/1971 | Scott . |
| 3,596,424 | 8/1971 | Ward . |
| 3,605,363 | 9/1971 | Bard . |
| 3,706,172 | 12/1972 | Keith . |
| 3,742,672 | 7/1973 | Schaeufele ..................... 52/588 X |
| 3,760,548 | 9/1973 | Sauer et al. . |
| 3,854,260 | 12/1974 | O'Hanlon . |
| 4,104,837 | 8/1978 | Naito . |
| 4,186,539 | 2/1980 | Harmon et al. ................. 52/588 X |
| 4,244,151 | 1/1981 | Seem . |
| 4,316,351 | 2/1982 | Ting . |
| 4,326,365 | 4/1982 | Svensson . |
| 4,373,312 | 2/1983 | Kim . |
| 4,402,167 | 9/1983 | Denucci . |
| 4,433,522 | 2/1984 | Yerushalmi . |
| 4,437,287 | 3/1984 | Halfaker . |

(List continued on next page.)

FOREIGN PATENT DOCUMENTS 517467 of 1978 Australia .
506883 10/1978 Australia .

(List continued on next page.)

OTHER PUBLICATIONS

Bondor Cold Storage System "Equibond Panel to Panel Joint" (1 page).

(List continued on next page.)

*Primary Examiner*—Carl D. Friedman
*Assistant Examiner*—Robert J. Canfield
*Attorney, Agent, or Firm*—Pravel, Hewitt, Kimball & Krieger

[57] ABSTRACT

A modular building panel having an interlock mechanism for connecting building panels in series is disclosed, includes two metal sheets separated by an insulating foam core bonded to the sheets and a first interlocking member on one side and a second interlocking member on the other side. The male connector configuration as well as the female connector configuration in this invention are both formed of curvilinear surfaces. The male connector as well as the female connector extends outwardly from the side faces of the foam so that the foam is protected from damage. The male connector is formed by bending the metal edge almost back upon itself. The female connector includes a V-shaped valley to ultimately receive the male connectors when the male connectors are in a nested position. The male and female connectors provide a double gutter system to improve the prevention of leakage and condensation.

5 Claims, 2 Drawing Sheets

U.S. PATENT DOCUMENTS

| | | |
|---|---|---|
| 4,438,614 | 3/1984 | Raith et al. . |
| 4,486,994 | 12/1984 | Fisher et al. . |
| 4,501,101 | 2/1985 | Davis . |
| 4,522,007 | 6/1985 | Oehlert . |
| 4,631,886 | 12/1986 | Vesterinen . |
| 4,640,437 | 2/1987 | Weingartner . |
| 4,748,783 | 6/1988 | Labelle . |
| 4,754,587 | 7/1988 | Glaser . |
| 4,757,658 | 7/1988 | Kaempen . |
| 4,769,963 | 9/1988 | Meyerson ............... 52/309.9 |
| 4,777,774 | 10/1988 | Smalley . |
| 4,984,406 | 1/1991 | Friesen . |
| 4,998,396 | 3/1991 | Palmersten ............ 52/588 X |
| 5,086,599 | 2/1992 | Meyerson ............... 52/309.9 |
| 5,138,812 | 8/1992 | Palmersten ............ 52/584 |

FOREIGN PATENT DOCUMENTS

| | | |
|---|---|---|
| 523758 | 11/1980 | Australia . |
| 71 458/81 | of 1981 | Australia . |
| 13 098/83 | of 1983 | Australia . |
| 86 969/82 | 3/1983 | Australia . |
| 568548 | 1/1986 | Australia . |
| 731416/87 | 3/1987 | Australia . |
| 588645 | 5/1988 | Australia . |
| 0006431 | 9/1980 | European Pat. Off. . |
| 0222667 | 5/1987 | European Pat. Off. . |
| 0072564 | 4/1970 | Fed. Rep. of Germany ........ 52/584 |
| 143008 | 7/1980 | Fed. Rep. of Germany . |
| 1245055 | 1/1961 | France . |
| 1571961 | 6/1969 | France . |
| 2303904 | 10/1976 | France . |
| 2444762 | 12/1978 | France . |
| 2461069 | 10/1979 | France . |
| 687202 | 9/1979 | U.S.S.R. . |
| 599011 | 3/1948 | United Kingdom . |
| 614394 | 12/1948 | United Kingdom . |
| 976927 | 12/1964 | United Kingdom . |
| 1066701 | 4/1967 | United Kingdom . |
| 1191656 | 6/1967 | United Kingdom . |
| 1168628 | 10/1969 | United Kingdom . |
| 1184521 | 3/1970 | United Kingdom . |
| 1249765 | 10/1971 | United Kingdom . |
| 1274927 | 5/1972 | United Kingdom . |
| 2057529A | 4/1981 | United Kingdom . |
| 2142670A | 1/1985 | United Kingdom . |
| 2168731A | 6/1986 | United Kingdom . |
| 2179832A | 6/1986 | United Kingdom . |
| 2175680A | 12/1986 | United Kingdom . |
| 634877 | 3/1990 | United Kingdom . |

OTHER PUBLICATIONS

METL-SPAN IV Insulated Panels (brochure and 3 drawings).
American Polystyrene Panel Descritpion Sheet (1 page).
Alumax Roof Panel Interlock Granco–002 and Granco–003 (2 pages).
Uni-Housing brochure (4 pages).
Hoesch Isowand (excerpt from brochure, 1 page).

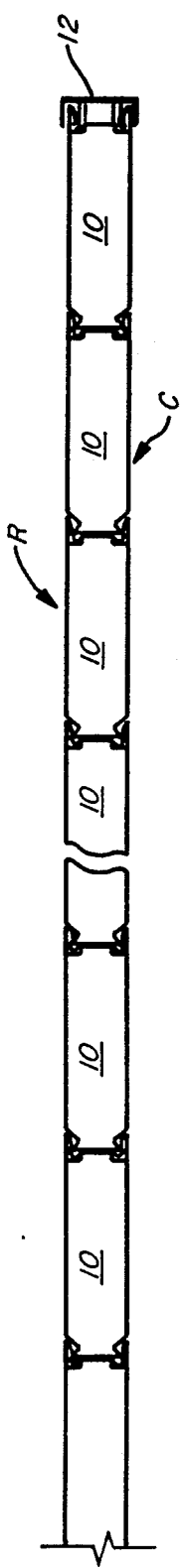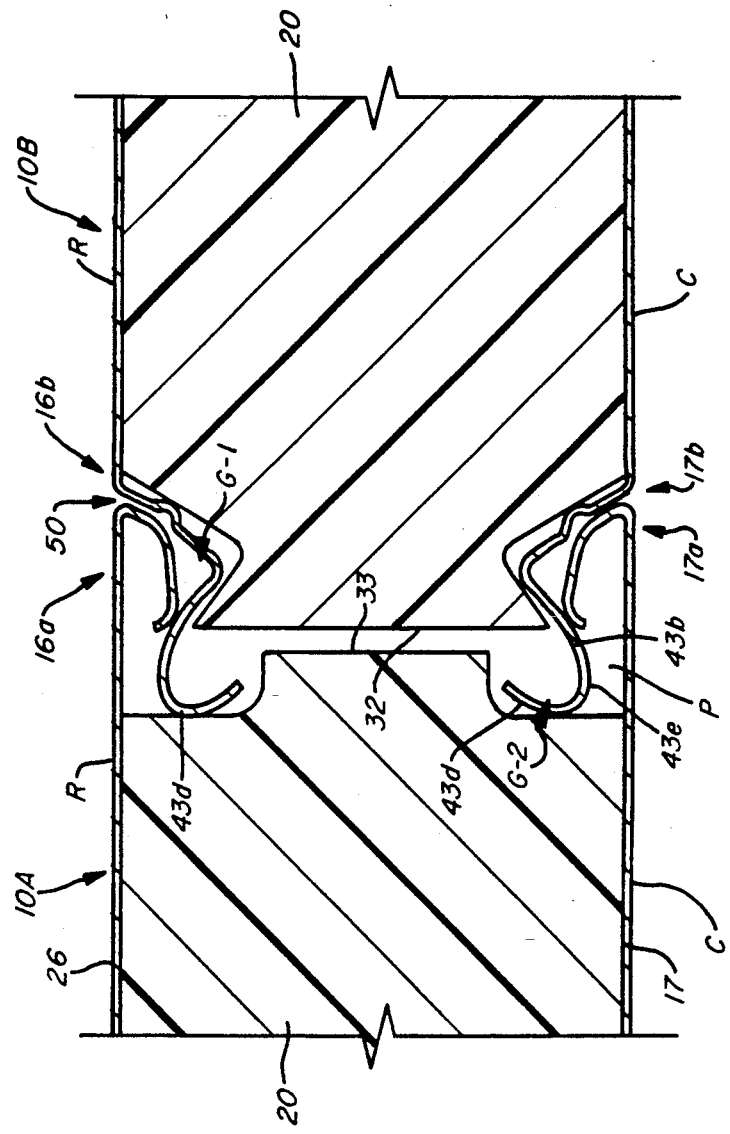

INSULATED PANEL

TECHNICAL FIELD OF THE INVENTION

The present invention relates to insulated, thin-skinned architectural panels and, more particularly, to such panels for the construction of overhead members and sidewalls.

BACKGROUND OF THE INVENTION

Insulated building panels for modular construction of walls, ceilings, or the like are well known in the art. Such insulated panels are generally formed of two outer, thin-skinned metal layers of aluminum or steel having an internal, relatively thick insulating core. The concept of insulated panels has been known for many years and various types of connections have been used to connect such panels together. For example, connection was made in many such panels utilizing an additional support member, such as a cleat, to actually connect together mating edge-to-edge outer skin members of the panel in order to provide connection. In the past, efforts have been made to eliminate such cleats and to provide edge connections which are formed by the edge structure itself so that no additional cleat or other connecting member is required.

An example of such an insulated panel is found in U.S. Pat. No. 4,769,963 of Meyerson. This patent discloses insulated panels wherein one edge, the male connector, is formed of right-angled surfaces in a U-shaped configuration and the other edge, the female connector, comprises a right-angled U-shaped groove behind an inclined ramp. The core between the ramp and groove connectors has a shaped wedge core face which extends outwardly from between the ramp and groove elements. The core face between the U-shaped male connectors is cup-like in shape and is positioned inside of the U-shaped interlock elements so that when adjacent panels are snapped together, the edges or faces of the core have a tight edge-to-edge insulating seal. In order to lock together the panels of the '963 Meyerson patent using this male and female metal edge configuration, it is necessary for the panel having the male edge configuration to approach the panel having the female edge configuration at an angle so that the edge-to-edge configurations can be snapped into position. When snapped together, the U-shaped male member fits face-to-face in surface-to-surface engagement within the U-shaped groove in the female member. The interlock fit is very tight so that it is practically impossible to separate the now connected panel members by pulling them apart in the same general direction as they were put together. The only way to disconnect the panel members of the Meyerson '963 patent is to slide one panel member with respect to the other along its length, which is a very difficult and cumbersome process since the panels may be up to thirty feet long.

Another disadvantage of the panel member illustrated in the '963 patent is condensation caused by water settling on the bottom skin of the roof panel. In the situation where the panel members are connected together to form a ceiling for a room such as a patio enclosure, the upper, outer metallic skin becomes the roof and the bottom or inner metallic skin becomes the ceiling. Any leakage which travels from the top edge-to-edge connection to the bottom edge-to-edge connection actually lands and puddles on the very bottom metallic skin, which is the ceiling in the room. If the settled or accumulated liquid is cold (such as cold rain in winter) as compared to the temperature within the room, the cold liquid can cause the thin-skinned inside panel metallic skin to be reduced in temperature to the point that condensation forms on the outside of this bottom skin member (which is actually within the enclosed room). Of course, any condensation on the bottom skin member, which is the interior or ceiling side of the room, is extremely undesirable since the water may then drip onto furniture, carpet, etc. and cause the various problems caused by a leaky roof.

The same inventor, Meyerson, also has U.S. Pat. No. 5,086,599 which was evidently an attempt to eliminate some of the problems found in the panel manufactured in accordance with the '963 patent. In the '599 patent, the male portions of the edge connections include an extra wing known as a sealant press in conjunction with a smaller size male U-shaped connection member such that upon placement of the male U-shaped member in the female U-shaped groove, a space known as a sealant pocket is provided. The sealant pocket is taught as being filled with some type of sealant to prevent the passage of liquid such as rain water. The connector edge design of the '599 patent does allow the panels to be joined together while in the same plane and the panels can be taken apart the same way. One disadvantage of the design of the '599 patent relates to reliance on caulking material generally, which is undesirable since caulking or other sealant material will, over time, age, shrink, and crack and thereby begin to leak. Further, filling the U-shaped groove of the female connector with caulk eliminates a potential gutter for outward flow of rain water. Another disadvantage of the panels of both the '963 and '599 patents is that the inner core section has a nose which extends beyond the end of the metal connector and is thus exposed for potential damage.

Another type of insulated foam panel known in the art utilizes curvilinear male and female connector members to provide edge-to-edge connections. In U.K. Patent Application GB 2 168 732A, the panel disclosed includes foamed in place insulating core material and outside metal skin tongue and groove edge connectors which mate together such that the internal core of insulating material touches. In the design of GB 2 168 732A, the lug forming the male portion is a curved member where the outer edge has been curved upon itself and the female grooved connector is internally bent to form a generally rounded groove which is adapted to receive the generally rounded end of the lug edge portion thereby providing an edge-to-edge flush connection. This type of panel has a desirable feature in that the connection may be made by pushing the panels together while the panels are in the same general plane rather than having to pivot one panel into place against the other. The lug edge connector has upper and lower internal chambers. The upper chamber is said to collect any dampness which occurs in the external face so that the droplets of water run away from the bottom of the roof element due to gravity. Further the bottom recess has a sealant reservoir; however, if the seal fails and the water entering the edge connection is greater in volume than mere dampness, the water will quickly collect on the upper surface of the lower lug and overflow in the room. Another panel of similar construction is GB 2 142 670A.

The utilization of the general concept of a male edge connector on a panel to be pressed into position in a groove, recess or valley in a female edge connector in a flush fit is well known in the art, dating back at least to U.S. Pat. No. 2,682,938 of MacDonald where the internal structure is provided by wood strips rather than with an expanded insulating material.

It therefore continues to remain a challenge in the development of edge-to-edge connectors for insulated roof panels to provide insulated roof panels which may be easily installed by pushing the panels together and may be easily be taken apart, and which will avoid leaking and condensation on the interior metallic skin.

Metal to metal edge male and female configurations have been used for many years to connect together "single skin" panels. Single skin panels are single sheets of thin-skinned material such as aluminum connected together edge-to-edge to form a ceiling or wall. The use of edge-to-edge connectors for such panels is well known. Such technology is adaptable to insulated panels by inverting one connector edge configuration and then evaluating the connection made between the potentially new edge-to-edge design. However, the characteristics and advantages in an insulated panel derived from a single skin edge connector design in the instance of this invention exceeds the mere routine evaluation and experimentation.

These and other objects and advantages will become apparent from the following description.

SUMMARY OF THE INVENTION

Accordingly, an insulated building panel of this invention has two metal sheets or skins separated by an insulating foam core bonded to the sheets. The outer metallic skins have on one set of edges male members or tongues and on the opposite edges female members or valleys capable of receiving the male members of an adjoining panel when the panels are connected in series. The female edge members each include a wide V-shaped valley terminating in an internally curved or curled end portion. The male member or tongue is curved back upon itself to form an internally rounded tongue member to be inserted into the V-shaped valley of the female edge connector. The male member is received by the female member by sliding the internal, curled or curved surfaces of the male member over the curled or curved surfaces of the female member until the male member rests or nests in the generally V-shaped valley of the female member to connect two adjacent panels. The panels so connected can be disconnected by pulling the panels apart, which releases the edge connection.

The insulating core for the opposing tongue or male edge connectors terminates in a flat surface positioned inside of the protruding tongue portion. Similarly, the core for the female edge connectors also terminates in a flat surface positioned inside of the internally curled end portion of the female connectors such that neither insulating core face extends outwardly beyond the metal edges of the connectors thereby avoiding damage to the insulating core.

Further, the panel system of this invention is designed to prevent or minimize leakage and condensation without use of caulking or other sealant in the following manner. When used as a combination ceiling/roof, the V-shaped valley of the female member cooperates with the internal surface of the male or tongue connector which rides in the valley to create an upper elongated gutter or flow channel which is generally triangular in cross section and extends the length of the joined panels. When the building panels are horizontally positioned such as for a ceiling/roof for a room, rain water entering the top connection collects in the elongated flow channel or gutter of the female connector and flows outwardly of the connector channel to spill harmlessly outside of the structure. However, should rain water collect within this upper flow channel so fast that the channel overflows, the overflow trickles down the opposing faces of the insulation and lands in the internally curved channel created by the internally curved end of the female connector which provides a secondary flow channel or gutter to direct flow outwardly of the panels. Collection of the water in this secondary channel will not cause condensation on the ceiling side due to spacing of the secondary channel away from the bottom surface of the male or tongue connector.

BRIEF DESCRIPTION OF THE DRAWINGS

FIG. 1 is an end view of panels according to the present invention interlocked together in edge-to-edge connection to form a ceiling;

FIG. 4 is an enlarged sectional view showing the interlock of connector elements between two adjacent panels.

DETAILED DESCRIPTION OF THE PREFERRED EMBODIMENT

Referring now to FIG. 1, there is shown a series of panels 10 connected to each other by an interlock mechanism made in accordance with the present invention. A side receiver channel 12 and side or end receiver channels (not shown but well known in the art) are nailed or screwed to overhead beams of a building such that the panels form a combined roof R and ceiling C for a room. Panels 10 are of a length and width as required for each specific construction requirement. Typically the length l far exceeds the width w for an individual panel.

Figure 2:
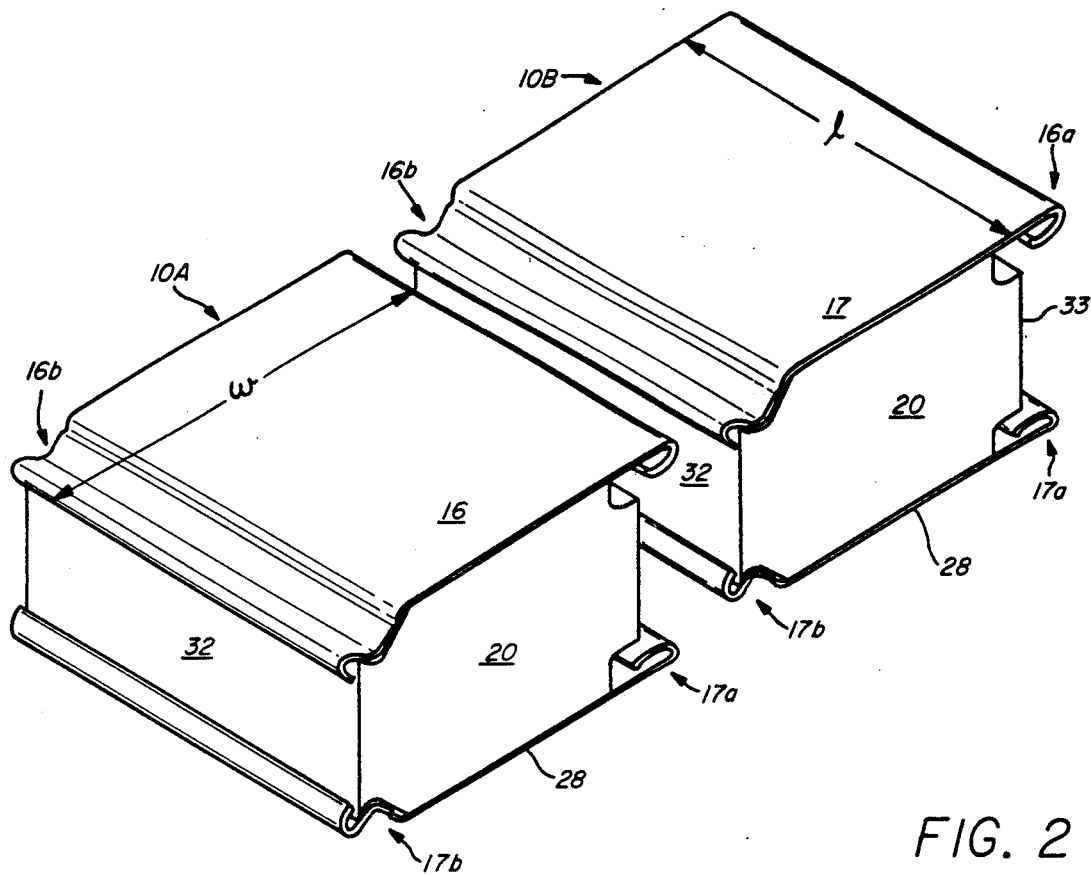
FIG. 2 is a perspective view of panel sections in adjacent position for connection together.
Figure 3:
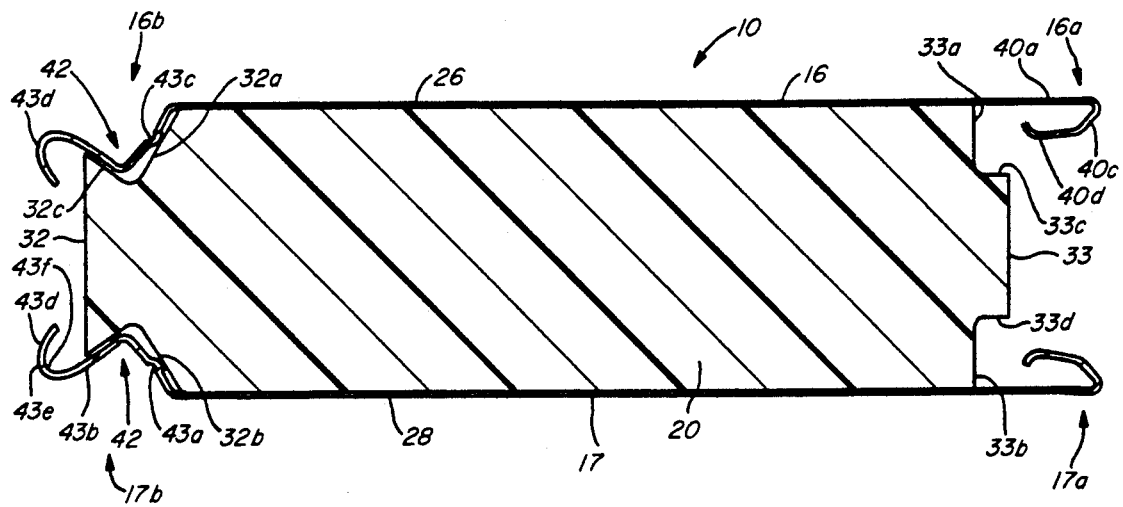
FIG. 3 is an end view in elevation of a panel illustrating the male connector configuration on one side and the female connector configuration on the other side.

Referring to FIGS. 2 and 3, the general structure of the panel members 10 will be described. Each panel member 10 includes first and second outer thin-skinned metal sheets 16 (top) and 17 (bottom) separated by an interior, insulated core 20. One side of each panel member 10 terminates in upper and lower male edge connectors 16a and 17a. The other side of the panel terminates in female edge connectors 16b and 17b.

Core 20 is constructed of any suitable pre-formed insulating material such as expanded polystyrene, urethane, polyisocyanate, or the like. For example, a polystyrene core width is 3" thick and having a 1½ lb. density is one preferred core material. The core 20 can also be foamed-in-place material if designed. Core 20 has oppositely facing substantially flat, major top and bottom surfaces 26 and 28, respectively, a reduced thickness side face 32 and opposite reduced thickness side face 33.

The reduced thickness core side face 33 is located inside the male edge connectors 16a and 17a. The side face 33 is formed by a first side faces 33a and 33b which intersect the flat core top 26 and bottom 28 at 90° angles. Outwardly projecting shoulders 33c and 33d extend from side faces 33a and 33b to form the side face 33 which extends the length of the panel. Reduced thickness core side face 32 is located internally of female edge connectors 16b and 17b. The side face 32 is formed in conjunction with a V-shaped core groove or valley on 32a formed by inclined surfaces 32b and 32c in both the upper and lower core surfaces 26 and 28. The inclined surfaces 32b and 32c intersect to form the core V-shaped valleys 32a which run the length of the panels 10.

Metal sheets or panels 16 and 17 are thin sheets of flexible metal, which may be aluminum or even steel. Panels having a thickness of 0.025 or 0.32 are preferred if aluminum. Top metal sheet 16 has a generally rectangular flat section such that its underside is intimately attached to top core surface 26 by a suitable glue as is known to persons of ordinary skill in this art. Bottom metal sheet 17 is a mirror image of top metal sheet 16 and, as such, it is shaped to conform with and to be attached to core bottom 28 by a suitable glue.

The male edge configurations of connectors 16a and 17a extend laterally outwardly from the reduced thickness core side face 33. The male connector 16a includes a flat section 40a joined with a first internally bent surface 40c which is further joined to inside surface 40d, which are formed by bending the previously flat side edge back upon itself. The generally internally curved configuration of the male edge connector 16a is formed utilizing a roll-forming machine as is known in the art. The male connector 17a on metallic sheet 17 is formed in a similar manner and thus the same numbers 40a, 40c and 40d will apply to the same surface elements. It should be noted that the interior core side face 33 is positioned inside of the internal surfaces 40c and 40d of the male connectors 16a and 17a thereby minimizing exposure of the core surface 33 to the dangers of damage during shipment and the like.

The configurations for the female connectors 16b and 17b are also formed on a roll-forming machine. The female connector 16b includes a generally V-shaped externally facing valley designated as 42 which is to receive the internal surfaces 40c and 40d of the male connector members 16a and 17a. The V-shaped valley 42 of the female connectors 16b and 17b is formed by a first internally inclined surface 43a which is intercepted by a second inclined surface 43b. The first inclined surface 43a includes an additional bend at 43c, which acts as an air escape to be further described. The intercepting inclined surface 43b, which inclines outwardly, includes an internally curled end portion 43d, which forms an externally facing curved surface 43e and internally facing curved surface 43f. The curved or curled end portion 43d of the female connectors 16b and 17b extends beyond the core face 32, thereby protecting the core face 32 from damage during shipment or otherwise. The angle of the bend of the female connector surfaces 43a is inclined slightly less than the angle of incline of the core surfaces 32b such that a V-shaped space is created between the female connectors and the V-shaped valley 32a in the core. This allows the female members to flex inwardly when the male connectors 16a and 17a are inserted into the female connectors 16b and 17b or to be adjusted as to distance between the female connectors as will be further described hereinafter.

Referring to FIGS. 2-4, the panels 10 are connected together in the following manner. As referred to in FIGS. 2 and 4, panel members 10A and 10B are positioned adjacent to each other for connection by pressing or sliding the panels together while the panels are held in generally the same plane. Therefore, it is not necessary that one panel be held cocked at an angle with respect to the other panel to connect the panels together in that they may be connected together while in substantially the same plane by pressing them against each other.

Referring to FIG. 2, the panels 10A and 10B appear to be almost square in shape. This of course is just an example. It is more typical for the panels to be rectangular with the long side 1 running along the length of the male and female connectors. For example, it is not unusual for the length of the panels to be 8' or more, such as for example, 20'. In these examples, the length of the male connectors 16a and 17a and the female connectors 16b and 17b would substantially match the length of the panel and thus be 8' or 20'.

As the panels are pressed together, the inside surfaces 40c and 40d of the male connectors which cooperate to form an internal curved surface, press against the exterior surface 43e of the internally curved or curled end portion 43d of the female connectors 17b causing the female connectors to temporarily deflect inwardly or internally slightly like a spring so that the male connectors 16a and 17a may enter or slide into the V-shaped valley areas 42 of the female connectors 16b and 17b. This spring cantilever deflection is allowed and encouraged by the elongated V-shaped cavity or space described earlier between the V-shaped core valleys 32a formed by core surfaces 32b and 32c and the V-shaped connector valleys formed by connector surfaces 43a and 43b. Internal deflection of the female connector members 16b and 17b is more desirable than external deflection of the male connectors 16a and 17a. For if the male connectors 16a and 17a were to deflect outwardly too far, the connectors could push outwardly the actual flat portions of the metallic skins 16 and 17 and cause delamination of the metallic skins 16 and 17 from the core surfaces 26 and 28, respectively.

When the male connectors 16a are seated or nested in the V-shaped valleys 42 of the female connectors 16b and 17b, they are in the relative positions illustrated in FIG. 4. As one may observe, the core surfaces 33 on the male connector side and 32 on the female connector side are designed to touch or almost touch when the male connectors are positioned within the female connectors. The virtual touching of the core surfaces 32 and 33 provide for better insulation than if there were a substantial air gap in this region. Given the lack of dimensional uniformity inherent in the manufacture of core material, it is almost impossible to guarantee in each instance that the core faces 32 and 33 will actually touch each other in every connection. It is sufficient to say that the core faces will either touch or be in such proximity as to substantially increase the regional insulating properties as compared to the circumstance where the core faces would be substantially apart.

One of the advantages of the configuration for the curvilinear male and female tongue and groove or valley connectors on the panels of this invention is that the panels may be taken apart by pulling one panel with respect to the other in virtually the same plane in which the panels were put together in the first place. This is a sharp contrast from the requirement that the panels be pulled apart by sliding them along their length, which is necessary in the connector design of U.S. Pat. No. 4,769,963 previously discussed.

It is not necessary to use caulk or sealant with this design. This is particularly advantageous since caulks are often not uniformly applied in the field and also deteriorate over time, which requires expensive service calls to repair any leaking areas.

One of the major problems with the utilization of pre-fabricated insulation panels, such as described in the prior art and in this application, is leakage and condensation. Leakage occurs whenever the connection or joint actually passes water all the way from the roof side R to the ceiling side C, such as for example during rain. Many of the prior art connectors utilize caulk or sealant to prevent leakage. As previously described, caulk and sealant have disadvantages in that they tend to deteriorate over time, thus increasing the chance for leakage.

The environment for condensation problems is as follows. When insulated panels are used as combination roof and ceiling members, the upper metallic skin 16 as a roof member R is exposed to outside weather and the bottom metallic skin 17 functioning as a ceiling member C is exposed to temperatures of the room, which may be approximately 72°. In circumstances where a cold rain falls, rain can in other panels leak through the panel and rest on the upper surface of the bottom metallic skin 17. Even though this cold rain water may not leak through such a panel, the cold water will reduce the temperature of the bottom panel skin sufficiently to cause condensation on the underside of the bottom panel, condensation of moisture from the air within the room. This condensation may build up and actually drip on the floor and furniture and is thus highly undesirable.

This invention provides a double gutter system to eliminate leak and condensation. Referring to FIG. 4, the first gutter G-1 is a triangular cavity (as seen in cross-section) formed by the V-shaped valley 42 provided by the female connector 16b on panel 10b in cooperation with the internal surface 40d of the male connector 16a. Water will collect within this triangular cavity G-1 which runs the length of the panel and will actually flow outwardly to the ends of the panel thus eliminating any further intrusion of water into the connected panels under many circumstances. (The water will normally flow outwardly because of the typical pitch of the roof, which is about ¼" of height per foot of length. The inclined surface 43a of the female connectors 16b and 17b have an elongated depression 43c which acts as an air escape as the gutter G-1 becomes filled with water and thus pushes out the air in the gutter. However, when the rainfall rate increases and exceeds the capacity of the triangular cavity or gutter G-1 to eliminate the collection of water, the water will overflow up over the internally curved portion 43d of the female connector 16b and the water will flow or trickle downwardly between the core section faces 32 and 33, landing in the upper, curved gutter recess G-2 formed by the internal curved surface 43f of the curled end portion 43d of the bottom female connector 17b on panel 10b. As can be seen in FIG. 4, the relative depth of the second gutter G-2 formed by the internally curved portion 43d is at least as great as the depth of the first gutter G-1 so that at least as much water may be collected in the second gutter G-2 and flow outwardly as was collected in the first gutter G-1. Thus this second or emergency gutter G-2 takes care of rain overflow situations.

However, there is still the problem of condensation. For example, in very cold weather where inside temperatures may be 72° F. and outside temperatures 20°, the freezing rain or snow may settle in the second gutter and cause a cooling of the ceiling if the ice is too close to the surface forming the ceiling C. Referring to FIG. 4, it is noted that the metallic skin surfaces 43b and 43d which form the second or emergency gutter G-2 are spaced from the flat surface 17 of the bottom male connector 17a to provide an elongated air pocket P extending the length 1 of the panels. The air pocket P serves to insulate the cold temperature of the water or ice in the gutter G-2 formed by portions 43d and 43e from the flat surface 17b of the bottom metallic skin thereby preventing the temperature of the bottom metallic skin 17 from falling to a point that condensation is induced in the room.

Therefore, the panel system of this invention including the male connectors 16a and 16b and female connectors 16b and 17b provide advantages not only in connection and disconnection but also in preventing leakage and condensation problems.

The configuration of the female connectors 16b and 17b in cooperation with the V-shaped clearance due to the spacing of core surfaces 32b and 32c have an additional advantage of adjustability. The actual angle between rolled surface 43a and the flat portion of each skin can vary from one female connector 16b or 17b to another due to manufacturing tolerances. The spring cantilever effect of the connectors 16b and 17b allows the worker at the job site to adjust the distance between the exterior surface portion 43e by firmly squeezing the curled end portion closer together if the fit with the male connectors is otherwise too tight. Also, if there is too much space in the gap 50 between the protruding end of the male connectors and the bending point on the female connectors, the curled ends 43d can be pulled apart to move the nested position of the male connectors closer to the surface 43a and thus in a more flush position. In each case, whether squeezing or pulling apart, sufficient force is exerted to permanently deform the female connectors to their new, adjusted position.

The foregoing disclosure and description of the invention is illustrative and explanatory thereof. Various changes in the details of the illustrated construction, the described method, or the materials used, can be made within the scope of the appended claims without departing from the true spirit of the invention.

What is claimed is:

1. An insulating building panel wherein side edges of the panel are connectable to a like adjacently positioned second insulated panel to a form a building system, the panel comprising:

a central core of insulating material including first and second major, flat surfaces and side faces;

first and second relatively thin, substantially flat and oppositely positioned metallic sheets attached to said first and second major surfaces of said central core of insulating material respectively, said flat metallic sheets forming male and female side edge connectors adapted to be respectively joined to female and male side edge connectors of a like adjacently positioned panel to form said building system;

said male side edge connectors being formed integrally with said oppositely positioned thin metallic sheets to form mirror image male connectors, each of said male connectors including an internal, generally convex curved surface;

said female side edge connectors being formed integrally with said oppositely positioned thin metallic sheets to form mirror image female connectors, said female connectors including an externally facing generally V-shaped valley formed with an internally curled end portion which provides an externally curved connector area and which terminates outwardly spaced from a side edge of said central core;

said internal curved surfaces of said male connectors of said panel being capable of sliding over externally curved connector areas of internally curled end portions of female connectors of a like adjacently positioned panel such that said internal curved surfaces of said male connectors are adapted to nest in said V-shaped valleys of female connectors of a like adjacently positioned panel, one of said side faces of a like adjacently positioned panel core being positionable substantially adjacent to a side face of said central core of said panel, said V-shaped valley on an upper female connector adapted to cooperate with an internal, generally curved surface of an upper male connector of a like adjacent panel to form an elongated space which functions as a first gutter system, and said internally curved end portion of a bottom female connector functioning as a second gutter system to avoid or minimize leakage and condensation whenever said panel is used with an adjacent like panel as combination roof and ceiling members.

2. A building system including at least two panels as set forth in claim 1:

said panels being adjacently positioned substantially horizontally to serve as combination roof and ceiling members such that said first or top metallic sheet of each panel serves as a roof and said second or bottom metallic sheet of each panel serves as a ceiling, one of said male connectors extending from said top metallic sheet and the other of said male connectors extending from said bottom metallic sheet of each panel, one of said female connectors extending from said top metallic sheet and the other of said female connectors extending from said bottom metallic sheet of each panel;

said panels being joined such that said internally curled end portion of said bottom female connector forming said second gutter system of one panel is spaced from a bottom surface of a joined male connector of another panel to create an insulating air spaced to prevent the formation of condensation on the bottom surface of said another panel.

3. The structure set forth in claim 1, including:

said side faces of said insulating core being generally aligned with said male and female connectors on said panel but being positioned inside of said male and female connectors to avoid damage to said core of said panel, said side faces being located substantially adjacent to an opposing side face of a like adjacent panel when panels are joined to form a building system.

4. The structure set forth in claim 1, including:

said major surfaces of said insulating core, as viewed in cross-section, including substantially V-shaped valleys which are aligned with said V-shaped valleys of said female connectors of said panel such that an elongated V-shaped gap is formed therebetween to allow said female connectors to temporarily deflect inwardly whenever male connectors of a like adjacent panel begin sliding into connection with said female connectors of said panel.

5. The structure as set forth in claim 3 including:

said internally curled end portion of said bottom female connector of said panel being positioned below said core side faces of said panel to receive water flowing down said core side faces and function as the second gutter system.

* * * * *